No. 721,108. PATENTED FEB. 17, 1903.
B. W. STOREY.
WOOD CARVING MACHINE.
APPLICATION FILED JAN. 28, 1902.
NO MODEL. 4 SHEETS—SHEET 2.

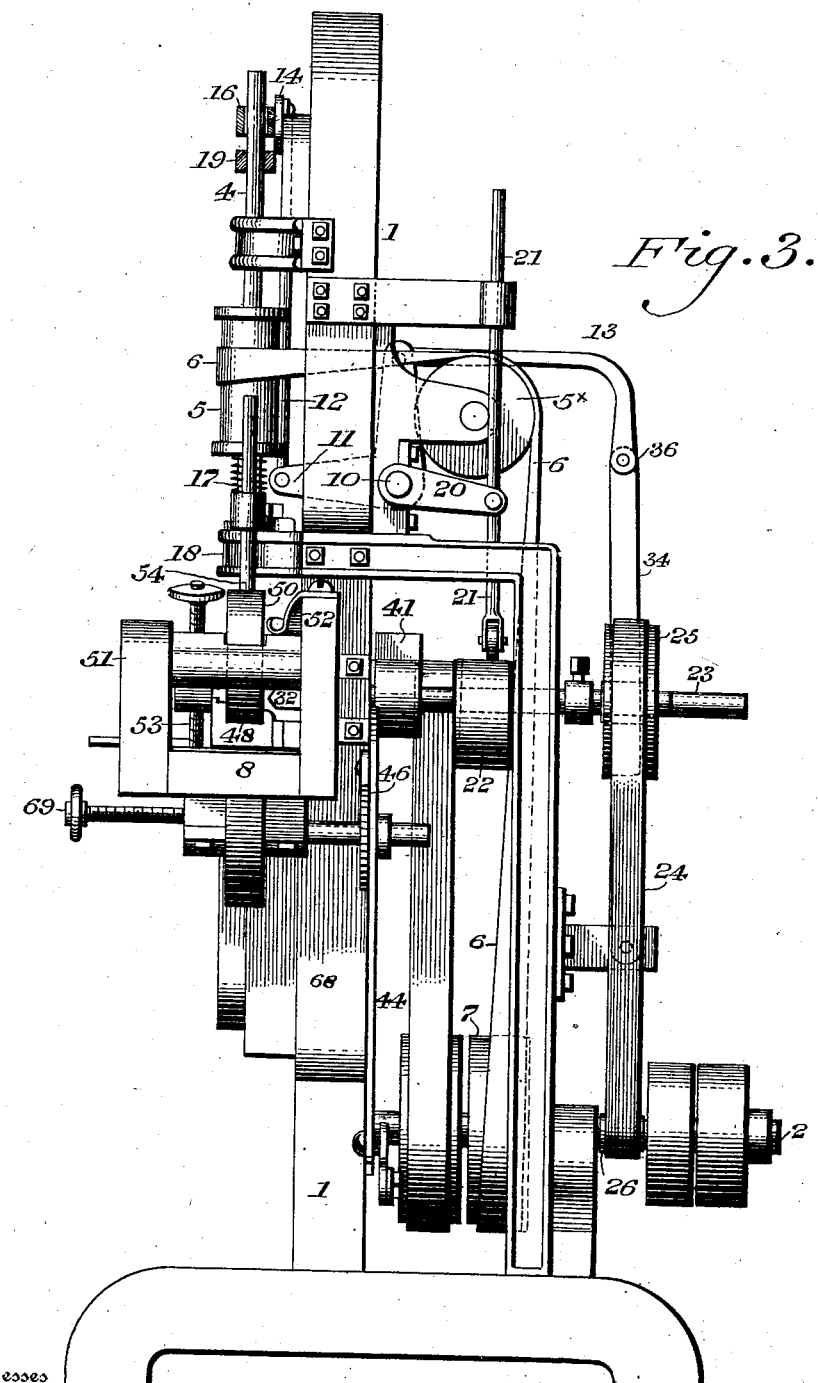

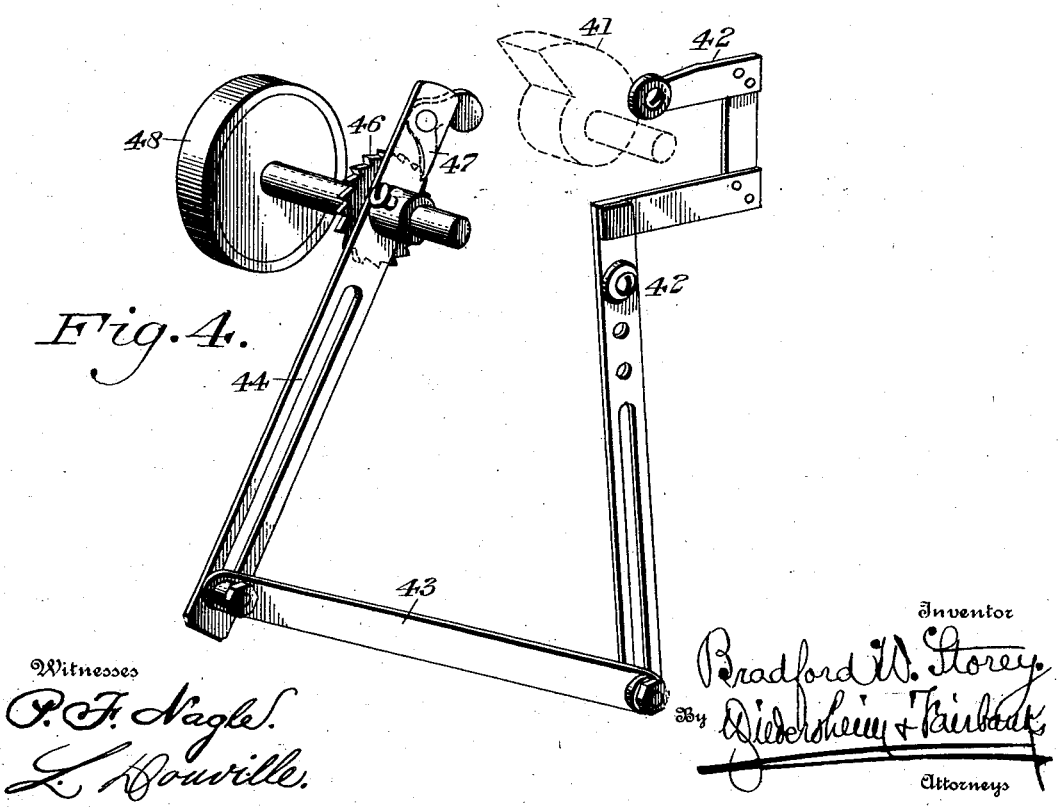

UNITED STATES PATENT OFFICE.

BRADFORD W. STOREY, OF MOUNT HOLLY, NEW JERSEY, ASSIGNOR, BY DIRECT AND MESNE ASSIGNMENTS, OF ELEVEN-TWENTIETHS TO RESTORE B. LAMB, OF BURLINGTON, NEW JERSEY, AND JOHN A. WIEDERSHEIM, OF PHILADELPHIA, PENNSYLVANIA.

WOOD-CARVING MACHINE.

SPECIFICATION forming part of Letters Patent No. 721,108, dated February 17, 1903.

Application filed January 28, 1902. Serial No. 91,601. (No model.)

*To all whom it may concern:*

Be it known that I, BRADFORD W. STOREY, a citizen of the United States, residing at Mount Holly, in the county of Burlington, State of New Jersey, have invented a new and useful Improvement in Wood-Carving Machines, of which the following is a specification.

My invention consists of a machine for carving wood, the same embodying a carving or cutter head and means for advancing the same to the piece to be carved and withdrawing it therefrom, and next a head adapted to carve the wood at a right angle to the first-named head and means for advancing said head to and from the said piece.

It also consists of a novel feed mechanism and details of construction, as will be hereinafter set forth, and pointed out in the claims.

Figure 1:
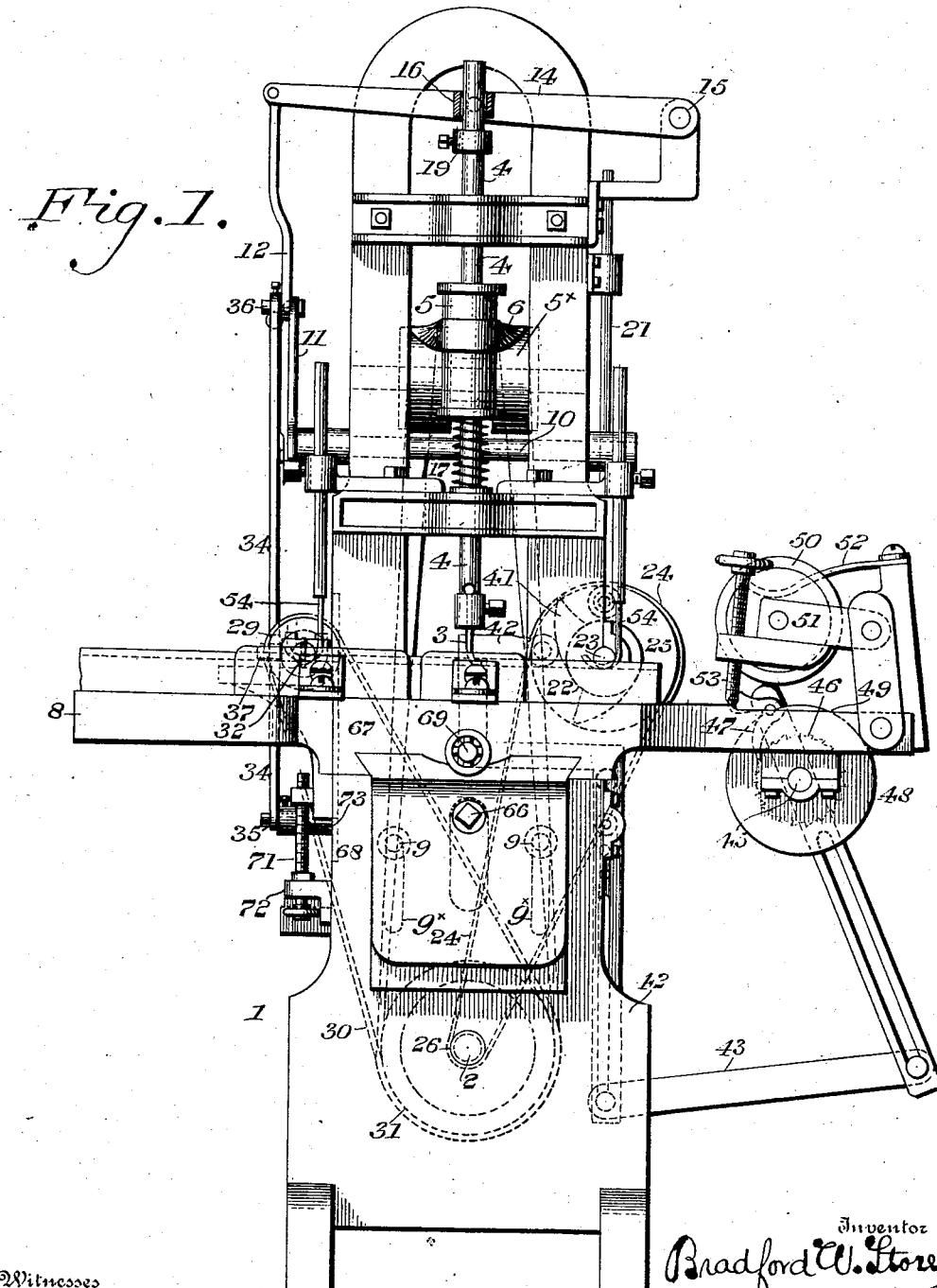
Figure 2:
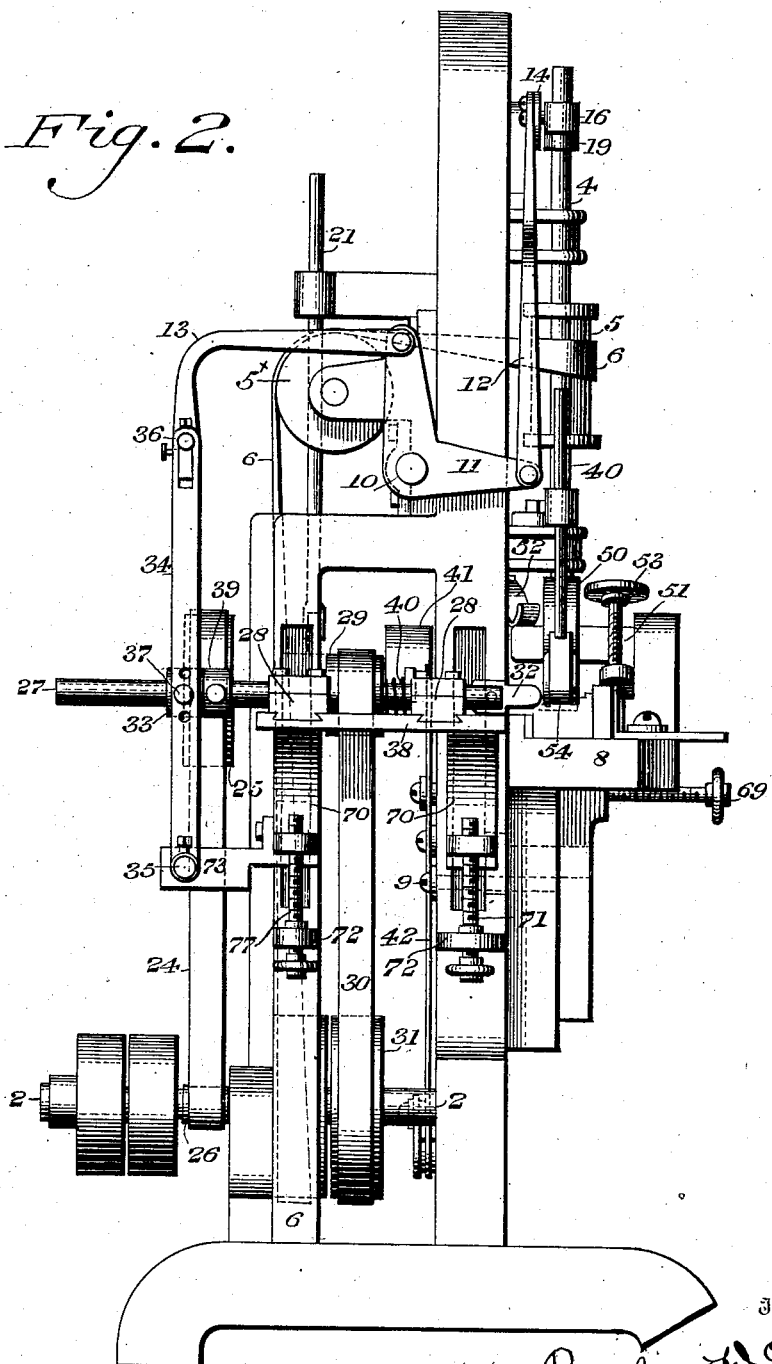

Figure 1 represents a front view of a machine for carving wood embodying my invention. Figs. 2 and 3 represent views of opposite sides thereof. Fig. 4 represents a perspective view of a detached portion, taken from the rear of the machine.

Similar numerals of reference indicate corresponding parts in the figures.

Referring to the drawings, 1 designates the frame of a machine, and 2 the driving-shaft, which is mounted thereon.

3 designates a cutter or cutter-head, which is connected with the vertically-arranged shaft or spindle 4, which is mounted on the frame 1 and carries the lengthened pulley 5.

6 designates an endless belt which is passed around said pulley 5 and guide-pulley $5^\times$ and a pulley 7 on the driving-shaft 2, it being evident that by these means rotary motion is communicated to the shaft 4 and the cutter 3 thereon.

8 designates the table of the machine, the same being connected with the frame 1 below the cutter 3 and made vertically adjustable by means of the screws 9 and the slots $9^\times$, the latter being in the frame of the machine, said screws being adapted to be passed through said slots and to be tightened in any suitable manner for firmly holding said table in adjusted position. On the frame 1 is mounted the horizontally-extending rock-shaft 10, to one end of which is attached the elbow-lever 11, to one limb of which is pivotally attached the rod 12 and to the other limb the arm or link 13.

14 designates an arm which has an axial connection at the top of the frame 1 at 15 and carries a collar 16, which is pivotally mounted thereon, said collar freely receiving the upper end of the shaft 4, it being here noticed that said shaft is adapted to be raised and lowered, for which purpose it has a free vertical movement in its bearings, and in order to be raised I employ the spring 17, which is seated against a fixed part 18 of the frame 1 and the lower end of the pulley 5, by which provision upward motion may be imparted to said shaft 4, and consequently the cutter thereon. Secured to the upper end of the shaft 4 below the collar 16 is the collar 19, whereby when the arm 14 is lowered the collar 16 bears against said collar 19, and so depresses the shaft 4, and with it the cutter 3, thus advancing the latter to the piece of wood to be carved, it being evident that said arm 14 is lowered and raised by the action of the elbow-lever 11, due to the reciprocating motion of the shaft 10, which carries it, said motion being occasioned by means of the crank-arm 20, which is pivotally connected with the rising or falling bar 21, which is engaged by the cam 22, the latter being mounted on the shaft 23, on which is the pulley 25, to which motion is imparted by the belt 24 and a pulley 26 on the driving-shaft 2. The bar 21 has a roller $21^\times$ on its lower end for evident purposes.

27 designates a horizontally-arranged shaft or spindle, which has its bearings 28 on the side of the frame 1, said shaft being adapted to move in said bearings in a direction to and from the table 8. On said shaft is secured the pulley 29, around which passes the belt 30, which also passes around the pulley 31 on the driving-shaft 2, by which provision rotary motion is imparted to said shaft 27. On one end of said shaft 27 is a cutter-head 32, and on the opposite end portion thereof is loosely mounted the collar 33, to which is connected the arm 34, the latter end whereof is mounted on the pivot 35 on the frame 1. The upper end of said arm is connected with the crank-arm 13 by the pivot 36, and said arm is connected with the collar 33 by the pivot 37. The pivots 35, 36, and 37 are extended laterally, and the bearings 28 for the shaft 27 are laterally movable on the portion 38 of the frame 1, (see Fig. 2,) by which provision said shaft 27 and connected parts may be readily moved to the right or left, as the case may be, and provision is thus made for adjusting the position of the head 32 in corresponding direction. Secured to the shaft 27 is the collar 39, the same being on the inner side of the collar 33 and being adapted to be engaged by said collar. Interposed between the pulley 29 and an adjacent bearing 28 of the shaft 27 is the spring 40, whose tendency is to force said pulley 29 in the direction toward the arm 34. It will be seen that when the elbow-lever 11 is operated motions are imparted to the arm 34, and such motion is communicated to the collar 33, whereby it comes in contact with the said collar 39, and the head 32 is advanced to the wood to be carved. On the return motion of said elbow-lever 11 the spring 40 becomes operative and bearing against the pulley 29 returns said head 32 from its work.

On the shaft 23 is a cam 41, with which engages one limb of an elbow-lever 42, which is mounted on the frame 1, the lower end of said lever having connected with it the link 43, to which is pivotally attached the swinging arm 44, which is freely mounted on a shaft 45 on the frame 1, said shaft having connected with it the ratchet 46, the teeth of which engage the pawl 47, whose bearings are on the upper end of the arm 44. Connected with the shaft 45 is a feed-roller 48, whose periphery is adapted to rotate through an opening 49 in the table 8 and projects slightly above the same, so as to engage with the piece of wood or timber to be carved and advance the same, it being evident that as the cam 41 operates the elbow-lever 42, link 43, and swinging arm 44 the pawl 47 imparts intermittent motions to the ratchet 46, and consequently to the feed-roller 48, such motion being communicated to the piece of wood on the table 8.

50 designates a pressure-roller which is mounted on the swinging bearings 51, whose axis is on one end of the table 8, said roller being located above the feed-roller 48, said bearings being engaged by the spring 52, whereby the roller 50 is held down to its work. In order to set or adjust the roller 50 to the thickness of the piece of wood to be carved and adjust the pressure of said spring 52, I employ the screw 53, which is passed through a suitable member of the bearing 51 and adapted to rest against or engage with the table 8, whereby the roller 50 may be raised or lowered. Connected with the frame 1, above the table 8, are feet 54, which are adapted to be lowered against the piece of wood, so as to prevent improper rising of the same from the table 8. On said table 8 are adjustable pieces 55, which are adapted to guide a piece of wood through the machine.

It will be seen that when power is communicated to the driving-shaft the same is transmitted to the other shafts and movable members of the machine, whereby as the arm 14 is drawn down the cutter 3 is lowered and engaging with the wood carves the same according to the contour of the cutter. Then the shaft 4 is raised by the action of the spring 17. The feed-roller 48 receives its intermittent motion, whereby the piece of wood is moved a predetermined distance, when the arm 14 is again lowered and the cutter-head 3 enters the wood at a fresh place and carves the same, as before. Then the cutter-head rises and the piece of wood is again advanced a predetermined distance, and so the work of carving the piece continues at intervals. Meanwhile the arm 34 is advanced by the action of the elbow-lever 11, thus moving the cutter-head 32 in a horizontal direction to the wood and causing it to act upon the face of the wood at the places between those subjected to the action of the cutter 3, thus carving said places. Then the arm 14 recedes and the spring 40 becomes operative to draw back the shaft 27, and with it the head 32, the latter thus clearing the piece of wood. The feed motion of the latter now continues, and the piece then dwells on the table. The head 32 is again advanced upon the wood at the next place, and so the carving and polishing operation continues until the work is accomplished, when the piece entirely run through is removed and a fresh piece placed on the table and interposed between the pressure and feed rollers, when the operations are repeated.

The table 8 is connected with the frame 1 by means of the pivot 66, whereby it may be placed at an inclination, and it is made of separate parts, as 67 and 68, connected by a dovetail joint. A screw 69 is applied to the part 67 and a proper portion of the frame, whereby said part 67 may be moved and adjusted nearer to or farther from the frame, according to requirements.

The portion 38 of the frame 1, which supports the bearings 28 for the shaft 27, which carries the head 32, is vertically adjustable on said frame, so as to lower and raise said head by means of the brackets 70, which carry said portion 38 and are freely fitted to the adjacent portions of said frame and are engaged by screws 71, which are swiveled, as at 72, on said frame, so that said portion 38, the bearings 28, the shaft 27, and the head 32 may be moved as one in vertical directions. In order to permit similar motions of the arm 34 and the pivot or stud 35, on which said arm is mounted, said stud has its bearing-piece 73 connected with the adjacent bracket 70, so as to be capable of rising and lowering with the same. (See Fig. 2.) In this case said arm 34 is adapted to be adjustably connected with the pivot or stud 37 and said arm 13, which receives motion from the lever 11. The heads 3 and 32 after cutting or carving the wood to the required penetration, thus reaching the full extent of their advance, dwell slightly, so as to remain corresponding on the contacting portions of the wood, while, however, rotating so as to remove any jaggedness or roughness on said portions, and thus impart a finish or polish to the same.

Having thus described my invention, what I claim as new, and desire to secure by Letters Patent, is—

1. Cutters disposed at an angle to each other, a rotatable reciprocatory spindle carrying one of said cutters, a rotary reciprocatory shaft carrying the other cutter, an arm pivotally mounted and freely receiving said spindle and constructed to depress the same, a spring acting in opposition to said arm to elevate the spindle, pivotal connections between said arm and the said shaft, a rock-shaft operatively connected with said pivotal connections, a shaft operatively connected with the driving-shaft, a cam thereon and means interposed between said cam and rock-shaft for actuating the latter.

2. Cutters disposed at an angle to each other, a rotatable reciprocatory spindle carrying one of said cutters, a rotary reciprocatory shaft carrying the other cutter, an arm pivotally mounted and freely receiving said spindle and constructed to depress the same, a spring acting in opposition to said arm to elevate the spindle, pivotal connections between said arm and the said shaft, a rock-shaft operatively connected with said pivotal connections, a shaft operatively connected with the driving-shaft, a cam thereon and means interposed between said cam and rock-shaft for actuating the latter, and transversely-movable bearings for said cutter-shaft movable independent of said pivotal connections.

3. A cutter-shaft and a spindle disposed at an angle to each other, means for independent reciprocation and rotation of said shaft and spindle, a rotatable shaft, a cam thereon, a rock-shaft, connections with said rock-shaft actuated by said cam, a bell-crank lever on said rock-shaft, pivotal interdependent connections between said cutter-shaft and spindle, independent means for returning said shaft and spindle to their normal position and independent means for moving said shaft and spindle lengthwise in their bearings.

4. A cutter-shaft and a spindle disposed at an angle to each other, means for independent reciprocation and rotation of said shaft and spindle, a rotatable shaft, a cam thereon, a rock-shaft, connections with said rock-shaft actuated by said cam, a bell-crank lever on said rock-shaft, pivotal interdependent connections between said cutter-shaft and spindle, independent means for returning said shaft and spindle to their normal position and independent means for moving said shaft and spindle lengthwise in their bearings, the bearings of the cutter-shaft being mounted for lateral reciprocation without disconnection of said cutter-shaft and the means which reciprocates it.

5. A rock-shaft, means for operating the same, a lever connected with said rock-shaft, a horizontal spindle, a connection between said spindle and lever, laterally-adjustable bearings for said spindle, a collar loosely mounted on said spindle, and operative connections having extended pivots upon which said connections are freely laterally movable to permit of the requisite movement of said spindle.

6. A rock-shaft, means for operating the same, a bell-crank lever connected with said rock-shaft, a horizontal spindle mounted to reciprocate in its bearings, said bearings being laterally adjustable, a collar loose upon said spindle, a link connected with said lever, a lever connected with said link and having connections with said collar, the pivots of said last-mentioned lever with its support, said collar and link being extended and said last-mentioned arm slidingly mounted on said pivots.

7. A rock-shaft, a bell-crank lever thereon, a crank-arm on said rock-shaft, a reciprocatory bar pivotally connected with said crank-arm, a rotatable shaft with cam to lift said bar, a horizontally-reciprocatory spindle, a vertically-reciprocatory spindle, a pivotal connection between said bell-crank lever and the horizontal spindle, a vertically-disposed rod connected with said bell-crank lever, a horizontally-disposed lever pivoted at one end and its other end pivotally connected with said rod and a pivotally-mounted collar carried by said lever and loosely receiving the upper end of the vertical spindle.

8. A horizontal spindle, bearings therefor in which the spindle is movable longitudinally, means for moving said bearings laterally, a collar on said spindle, a pivotally-supported lever and operating means therefor to move said spindle endwise, and a connection between said lever and collar, said lever having loose connection with the collar and with its pivotal support movable transversely of the length of the spindle to permit of adjustment of said collar without disengagement of the lever and its said pivots.

9. In a wood-carving machine, a horizontally-disposed shaft, bearings therefor mounted for lateral adjustment and in which said shaft is endwise movable, a collar loosely mounted on said shaft, a bell-crank lever and its actuating means, a link connected with one arm of said bell-crank lever and a lever at right angles to said shaft pivoted at its lower end on a laterally-extended pivot on the frame of the machine and between its ends on a laterally-extended pivot on said collar and at its upper end on a laterally-extended pivot having connection with said link, and a collar fixed on said shaft and means on said shaft for normally forcing the same toward said movable collar.

BRADFORD W. STOREY.

Witnesses:
JOHN A. WIEDERSHEIM,
WM. CANER WIEDERSHEIM.